UNITED STATES PATENT OFFICE.

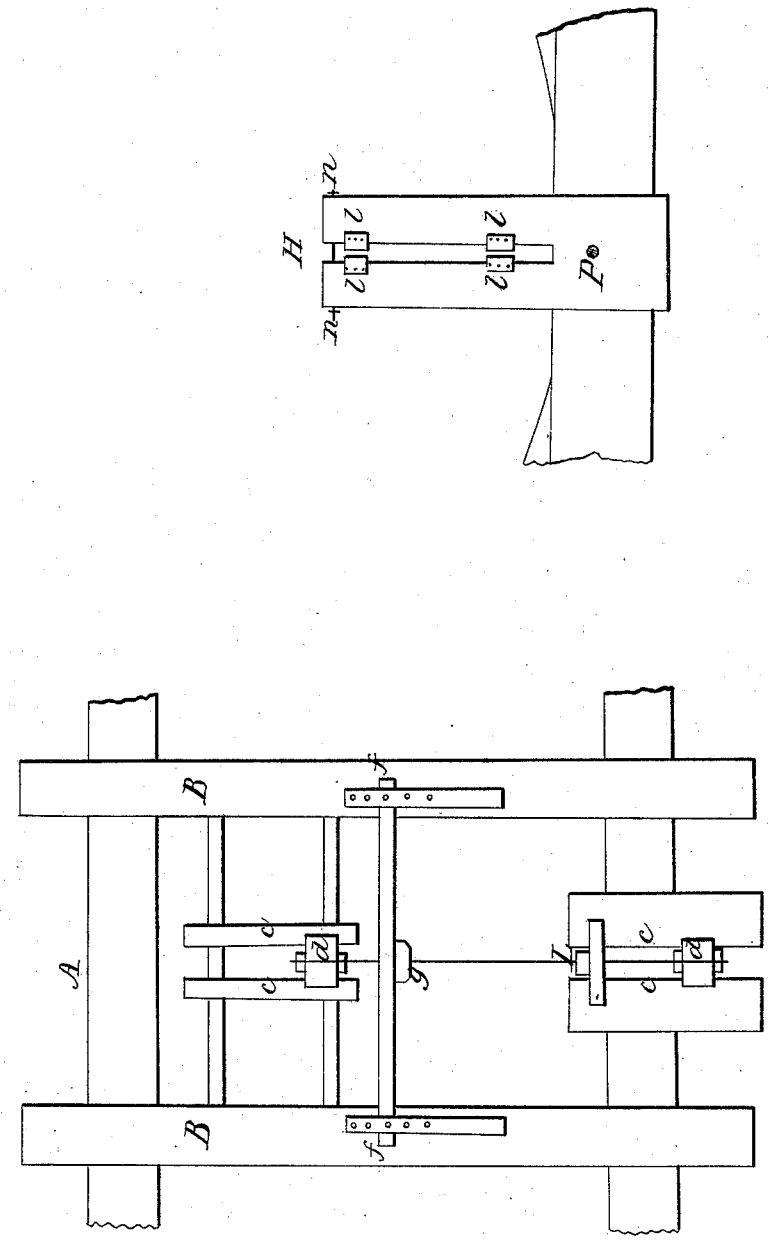

JONA. NORCROSS, OF PUTNAM COUNTY, GEORGIA.

MILL-SAW GUIDE.

Specification of Letters Patent No. 3,210, dated August 4, 1843.

*To all whom it may concern:*

Be it known that I, JONATHAN NORCROSS, of the county of Putnam and State of Georgia, have invented a new and useful Improvement for Sawing Lumber; and I do hereby declare that the following is a full, clear, and exact description of the construction and operation of the same, reference being had to the annexed drawings, making a part of this specification.

The large drawing A, represents a front view of the fenderpost and saw of the mill.

B, B, are the fenderpost and the blue or center line is the saw.

C, C, C, C, are wooden slides made in the V form.

$d, d$, are wooden boxes fixed to each end of the saw, and play up and down with the saw upon the slides.

$f, f$, is a plank three inches thick and eight inches wide extending from fenderpost to fenderpost in front of the saw, and fastened by a wooden clamp and a pin at each end and movable up and down by means of the pins.

G is a self regulating guide fastened to this plank by means of pin or screw bolt. This guide I make of hard wood three inches thick six inches wide one eighteenth inches long. The drawing H presents a vertical or ground view of this guide.

$l, l, l, l$, are thin pieces of copper facing the inside of the guide and fastening on the upper and lower sides with small nails so placed as for two to be at the roots of the saw teeth and two at the back of the saw and just far enough apart to allow the saw to play up and down without friction.

$n, n$, is a screw bolt passing through the guide at the back of the saw to draw the parts together when necessary.

P is the iron pin or screw bolt which fastens the guide in front of the saw and upon which it turns freely.

S in the drawing A is the lower guide made precisely in the same manner as the other, placed below the log and fastened to a permanent piece of wood by a bolt in front of the saw like the one shown. It is plain that guides fixed in this manner will prevent the saw from running by throwing its back in the same direction that its edge inclines to run, thereby bringing it again into line.

What I claim as my invention and desire to secure by Letters Patent is—

The self regulating guide which fastens by a single pin in front of the saw, being constructed and operating substantially as herein set forth.

JONA. NORCROSS.

Test:
T. C. DONN,
T. MOORE.